United States Patent
Ross et al.

(10) Patent No.: US 11,657,511 B2
(45) Date of Patent: May 23, 2023

(54) HEURISTICS-BASED DETECTION OF IMAGE SPACE SUITABLE FOR OVERLAYING MEDIA CONTENT

(71) Applicant: salesforce.com, inc., San Francisco, CA (US)

(72) Inventors: Alan Martin Ross, San Francisco, CA (US); Jessica Lundin, Seattle, WA (US); Michael Reynolds Sollami, Cambridge, MA (US); Brian J. Lonsdorf, Moss Beach, CA (US); David J. Woodward, Bozeman, MT (US); Owen Winne Schoppe, Orinda, CA (US); Sonke Rohde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/162,245

(22) Filed: Jan. 29, 2021

(65) Prior Publication Data
US 2022/0245820 A1 Aug. 4, 2022

(51) Int. Cl.
*G06T 7/00* (2017.01)
*G06T 7/11* (2017.01)
*G06T 5/00* (2006.01)
*G06T 7/194* (2017.01)
*G06T 7/13* (2017.01)
(Continued)

(52) U.S. Cl.
CPC ............... *G06T 7/11* (2017.01); *G06T 5/002* (2013.01); *G06T 5/20* (2013.01); *G06T 7/13* (2017.01); *G06T 7/194* (2017.01); *G06V 20/46* (2022.01)

(58) Field of Classification Search
CPC .. G06T 7/11; G06T 7/194; G06T 7/13; G06V 20/46
See application file for complete search history.

(56) References Cited

U.S. PATENT DOCUMENTS

| | | | |
|---|---|---|---|
| 2005/0013486 A1* | 1/2005 | Wiedemann | G06V 20/13 382/181 |
| 2006/0026628 A1 | 2/2006 | Wan et al. | |

(Continued)

OTHER PUBLICATIONS

Liu, W., Anguelov, D., Erhan, D., Szegedy, C., Reed, S., Fu, C. Y., & Berg, A. C. (Oct. 2016). Ssd: Single shot multibox detector. In European conference on computer vision (pp. 21-37). Springer, Cham.*

(Continued)

*Primary Examiner* — Sarah Lhymn
(74) *Attorney, Agent, or Firm* — Fenwick & West LLP

(57) ABSTRACT

Disclosed herein are system, method and computer readable storage medium for detecting space suitable for overlaying media content onto an image. The system receives an image which may be an image or a video frame. The image is processed using a number of image processing techniques in order to automatically propose spaces for inserting media content onto the image. The proposed spaces may then be further analyzed using a heuristics-based approach to select bounding boxes for inserting media content. Subsequently, one or more media content items may be selected for insertion onto the bounding boxes on the image. The system may then cause a display of the image with the selected media content item overlaid onto the image within the selected bounding boxes.

20 Claims, 7 Drawing Sheets

(51) Int. Cl.
    *G06T 5/20*     (2006.01)
    *G06V 20/40*     (2022.01)

(56) References Cited

U.S. PATENT DOCUMENTS

| | | | | |
|---|---|---|---|---|
| 2010/0174985 | A1* | 7/2010 | Levy | G06F 16/93 |
| | | | | 715/244 |
| 2016/0063727 | A1* | 3/2016 | Gao | G06V 20/52 |
| | | | | 382/103 |
| 2017/0039457 | A1 | 2/2017 | Yu et al. | |
| 2017/0278289 | A1 | 9/2017 | Marino et al. | |
| 2018/0013977 | A1 | 1/2018 | Martineau | |
| 2018/0089505 | A1* | 3/2018 | El-Khamy | G06N 3/0454 |
| 2019/0222776 | A1 | 7/2019 | Carter et al. | |
| 2020/0005033 | A1* | 1/2020 | Bellert | G06F 16/93 |
| 2020/0327375 | A1* | 10/2020 | Naveh | G06K 9/623 |
| 2021/0182628 | A1* | 6/2021 | Regina | G06N 20/00 |
| 2021/0383106 | A1* | 12/2021 | Maggio | G06V 10/25 |

OTHER PUBLICATIONS

Zhao, Y., Yuan, Z., & Chen, B. (2019). Training cascade compact cnn with region-iou for accurate pedestrian detection. IEEE Transactions on Intelligent Transportation Systems, 21(9), 3777-3787.*
Breuel, T. M. (2002, August). Two geometric algorithms for layout analysis. In International workshop on document analysis systems (pp. 188-199). Springer, Berlin, Heidelberg.*
Liao, M., Shi, B., & Bai, X. (2018). Textboxes++: A single-shot oriented scene text detector. IEEE transactions on image processing, 27(8), 3676-3690.*
PCT International Search Report and Written Opinion, PCT Application No. PCT/US2021/015739, dated Jul. 15, 2021, 15 pages.
United States Office Action, U.S. Appl. No. 17/116,944, dated Jan. 27, 2022, 17 pages.
Alibaba Cloud, "Alibaba Luban: AI-based Graphic Design Tool," Dec. 19, 2018, seven pages, [Online] [Retrieved on Jan. 19, 2021] Retrieved from the Internet <URL: https://www.alibabacloud.com/blog/alibaba-luban-ai-based-graphic-design-tool_594294>.
Hua, X., "Challenges and Practices of Large Scale Visual Intelligence in the Real-World," MM '18: Proceedings of the 26th ACM international conference on Multimedia, Oct. 2018, pp. 364.
Lin, T. et al., "Microsoft COCO: Common Objects in Context," arXiv:1405.0312, Feb. 21, 2015, pp. 1-15.
Redmon, J. et al., "You Only Look Once: Unified, Real-Time Object Detection," arXiv: 1506.02640, Nov. 12, 2015, pp. 1-10.
Ren, S. et al., "Faster R-CNN: Towards Real-Time Object Detection with Region Proposal Networks," IEEE Transactions on Pattern Analysis and Machine Intelligence, vol. 39, Iss. 6, Jun. 2017, pp. 1-9.
Rohde, S., "Einstein Designer—AI-Powered, Personalized Design at Scale," Jun. 23, 2020, 14 pages, [Online] [Retrieved on Jan. 19, 2021] Retrieved from the Internet <URL: https://medium.com/salesforce-ux/einstein-designer-ai-powered-personalized-design-at-scale-367d71b85a3d>.
Unsplash, "Unsplash: The internet's source of freely-usable images," Date Unknown, four pages, [Online] [Retrieved on Jan. 19, 2021] Retrieved from the Internet <URL: https://unsplash.com/>.
Vempati, S. et al., "Enabling Hyper-Personalisation: Automated Ad Creative Generation and Ranking for Fashion e-Commerce," arXiv:1908.10139, Aug. 27, 2019, pp. 1-10.
United States Office Action, U.S. Appl. No. 17/116,944, dated Oct. 19, 2022, 19 pages.

* cited by examiner

Grey-scale Image 100

Edge detection using ShenCastan filter 210

Saliency Computation 220

People/Face Detection 230

232  234

Adaptive image binarization
310

Foreground/ background estimation
320

Visual entropy determination
330

Binary matrix using downsampling
340

Candidate bounding boxes in binary matrix
350

Grid Snapping Example

Pyramidal Grouping Example

HEURISTICS-BASED DETECTION OF IMAGE SPACE SUITABLE FOR OVERLAYING MEDIA CONTENT

TECHNICAL FIELD

The disclosure generally relates to the field of selecting space within an image or a video frame where content can be inserted and more specifically to heuristic-based detection of space in an image that is suitable for overlaying media content.

BACKGROUND

Many images and video frames include areas where text and other content may be inserted without obscuring important part or parts of the image or the video frame. Those areas are sometimes referred to as copy space. For example, an image or a video frame may focus on a ship and the people on that ship. However, that image or video frame may include areas where the primary visual elements in the image is a sky and/or ocean. Those areas may be used for displaying text or other media content (e.g., images). In one example, those areas may be used to display additional content items to a viewer. In another example, copy space may be used to insert links and other information into an image or a video frame.

Various systems are available today that enable a curator to mark copy space on an image. That process is usually time consuming and inefficient when hundreds of thousands of images of video frames must be marked. Therefore, it is desirable to automatically and accurately identify copy space on images and video frames.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
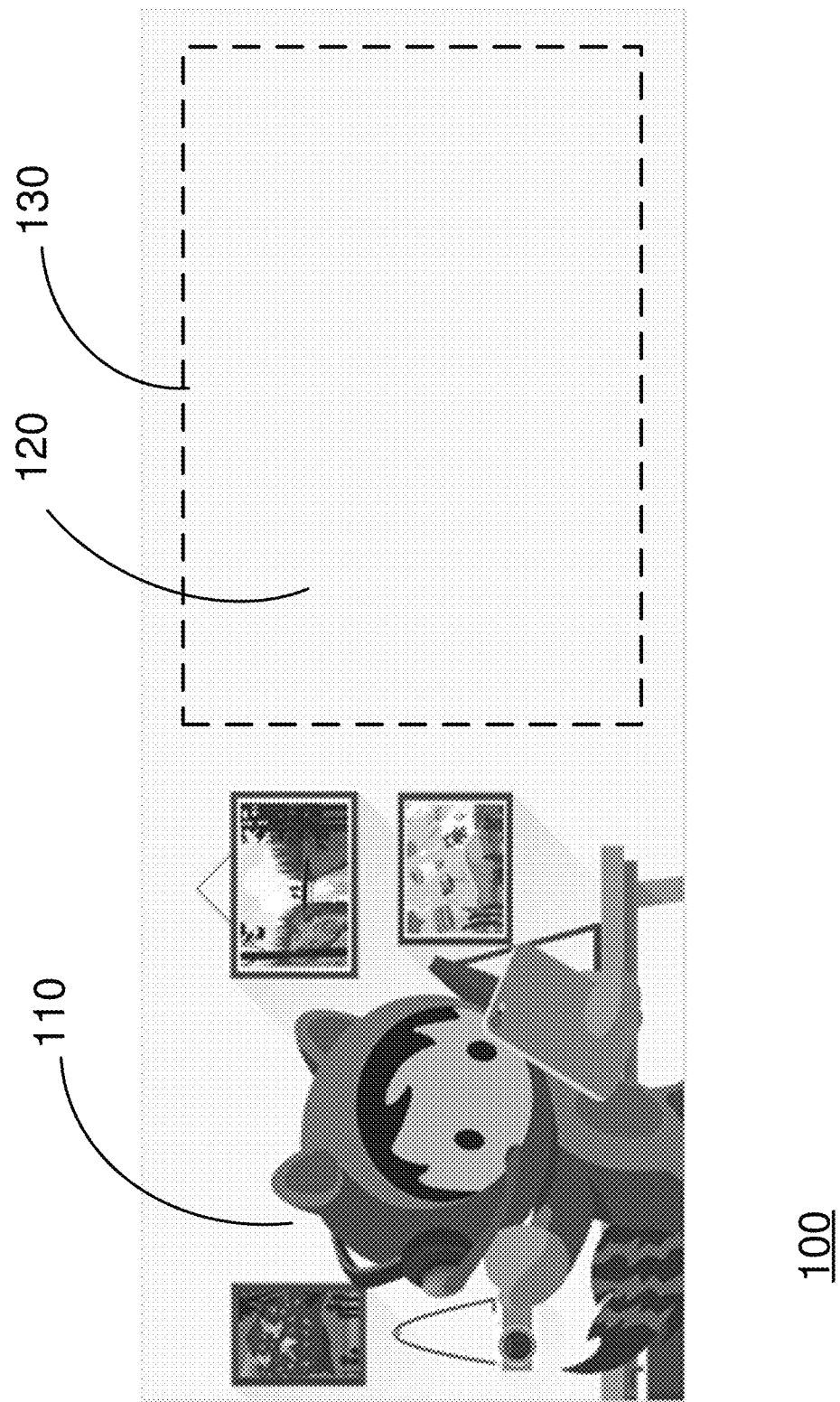
FIG. 1 illustrates a candidate image with an exemplary identified space for overlaying media content items, in accordance with some embodiments.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

The placement of text over an image is an important part of producing high-quality visual designs. Application areas for copy space detection include generation of email banners, homepages, and call-to-actions, etc. These are mostly performed manually, and therefore making the task of graphic asset development time-consuming, requiring designers to curate and manipulate media and vector graphics, build up layer stacks, and finally place and format text, all while balancing style, brand consistency and tone in the design. Automating this work by selecting appropriate position and orientation, and style for textual elements requires understanding the contents of the image over which the text must be placed. Furthermore, establishing parameters of copy spaces where media content such as text may be rendered over images is distinct from foreground-background separation approaches in image processing because the resulting separation maps may not account for portions of the image that may be potentially overlaid with media content without disrupting significant visual elements in the image.

Disclosed herein are system, method and computer readable storage medium for detecting space suitable for overlaying media content onto an image (i.e., copy space, insertion space). The system receives an image which may be an image or a video frame. Generally, an image or a video frame may have space for inserting media content without covering vital portions of the image. Embodiments of the system process the image to determine occupied and unoccupied spaces in the image, and subsequently select regions in the unoccupied spaces to overlay media content on the image. The image is processed using a number of image processing techniques in order to automatically propose spaces for inserting media content onto the candidate image. The proposed spaces may then be further analyzed using a heuristic rules-based approach to select insertion spaces for inserting media content. The selected insertion spaces may be defined by bounding boxes with predefined parameters by the system. Subsequently, one or more media content items may be selected for insertion onto the selected bounding boxes in the image. The system may then cause a display of the image with the selected media content item overlaid onto the image within the selected bounding boxes.

FIG. 1 illustrates an exemplary image 100. As depicted, one portion 110 of the image 100 may have multiple visual elements, while another portion 120 of the image 100 may be devoid of visual elements or may be identified as having visually non-essential elements (for e.g., textural background, blank space, clouds, tree canopy, beach sand, etc.). Embodiments described herein are directed to automatically identify insertion spaces, also termed bounding boxes herein, with visually non-essential elements, and where media content items may be inserted without visually impacting any visually essential elements of the image. For example, an insertion space 130 may be identified by an embodiment such that any media content may be overlaid on top of image 100 within the identified insertion space 130.

FIGS. 2A-2D illustrate exemplary image processing that may be performed on an image in accordance with some embodiments.

Figure 2A:
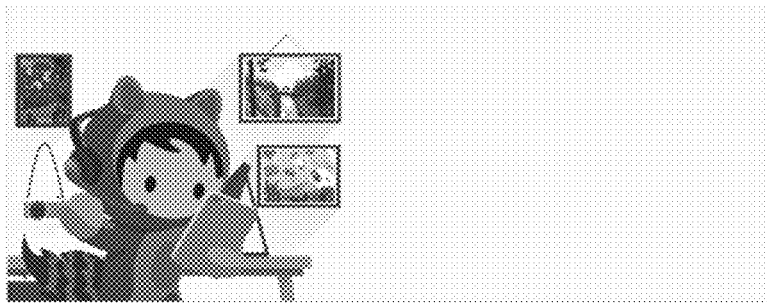
FIG. 2A-2D illustrate results of various image processing techniques on a candidate image, in accordance with some embodiments.

FIG. 2A shows the greyscale image 100 depicted in FIG. 1. In embodiments described herein, when insertion space needs to be selected for a color image, preprocessing may be performed on the color image to first obtain a corresponding greyscale image 100 and subsequently processed as described herein. In some embodiments, the greyscale image 100 may be blurred (e.g., by using a low pass filter) to remove noise in the image before further processing occurs.

Figure 2B:
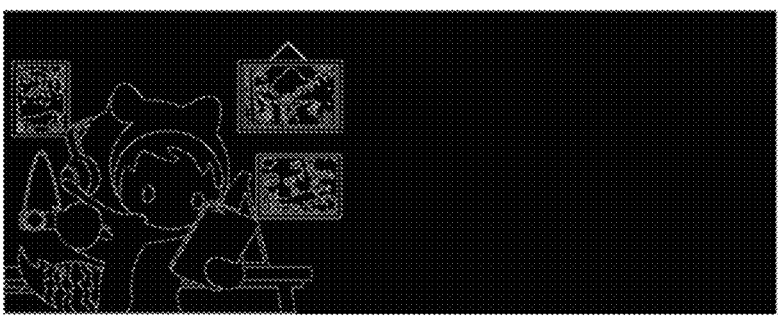

FIG. 2B depicts the results 210 of performing edge detection on the image 100. The identified image discontinuities in the image 100 are organized by an edge detection filter into a set of line segments, i.e., edges. The depicted edge-detected image 210 is obtained using the ShenCasten edge detection filter on image 100. Similar results may be obtained using the Sobel filter.

Figure 2C:
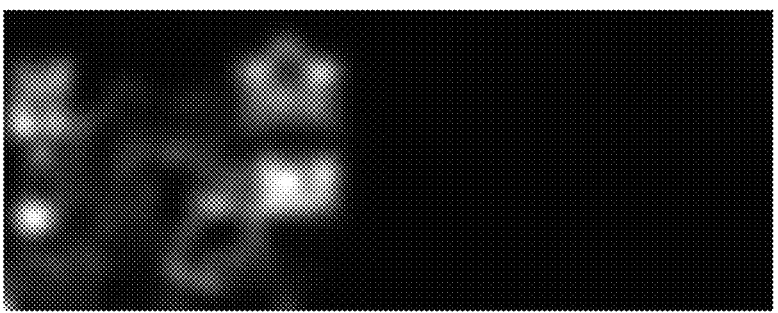

FIG. 2C depicts the results 220 of performing saliency filtering on the edge-detected image 210. Saliency filtering is an image segmentation process that assists in locating objects and boundaries. The depicted saliency-filtered image 220 is obtained using the saliency filter on edge detected image 210.

Figure 2D:
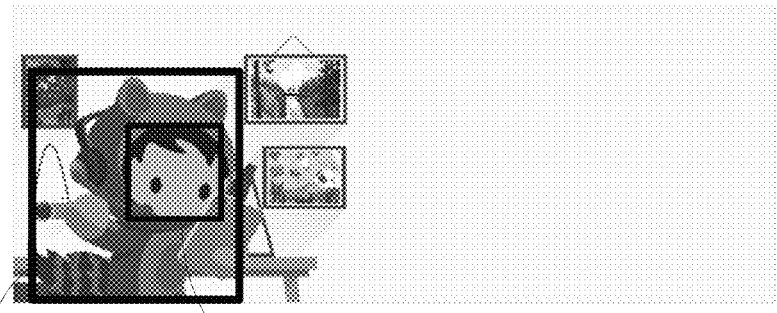

FIG. 2D depicts the results 230 of processing the greyscale image 100 to block out text, faces, and people using single shot text detector (ssd) networks and standard classifiers and object detection. This processing determines regions 232 and 234 which are subsequently blocked out as occupied spaces by people detection and face detection classifiers. While not depicted herein, any textual elements in the greyscale image 100 may also be blocked out by processing the image 100 using ssd networks. In embodiments herein, this processing to block out text, faces, and people may be carried out as independent processing on the greyscale image 100 to provide further indications of occupied and unoccupied space, in addition to the image processing described herein.

FIGS. 3A-3E illustrate exemplary image processing that may be performed on an image to generate a binary matrix in accordance with an embodiment.

Figure 3A:
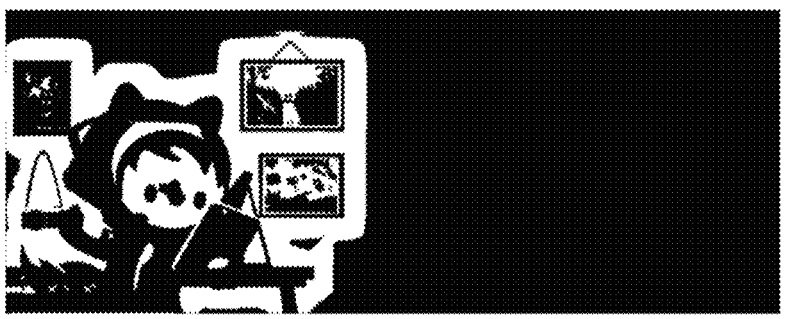
FIG. 3A-3E illustrate results of various image processing techniques on a candidate image, in accordance with some embodiments.

FIG. 3A depicts the results 310 of performing local adaptive binarization on the saliency filtered image 230.

Figure 3B:
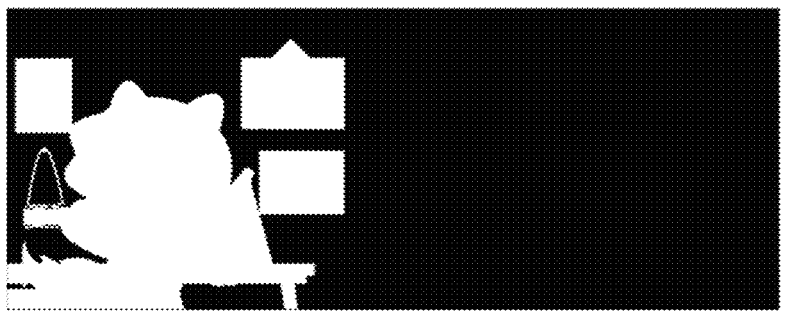

FIG. 3B depicts a foreground/background separation image 320 that is generated from the original greyscale image 100 and the saliency filtered image 230 on which adaptive binarization has been performed, i.e., image 310.

Figure 3C:
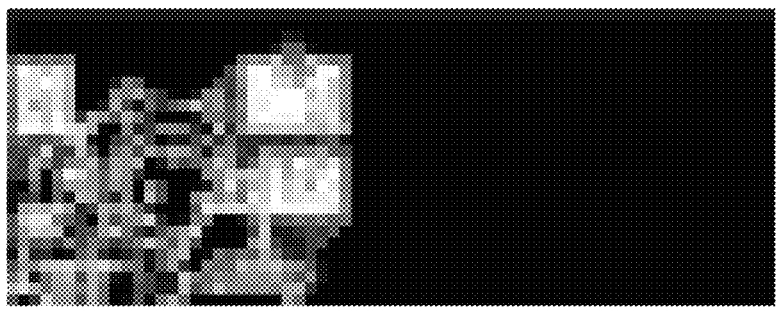

FIG. 3C depicts the results of using a visual entropy filter on the foreground/background separation image 320 to generate the visual entropy filtered image 330.

Figure 3D:
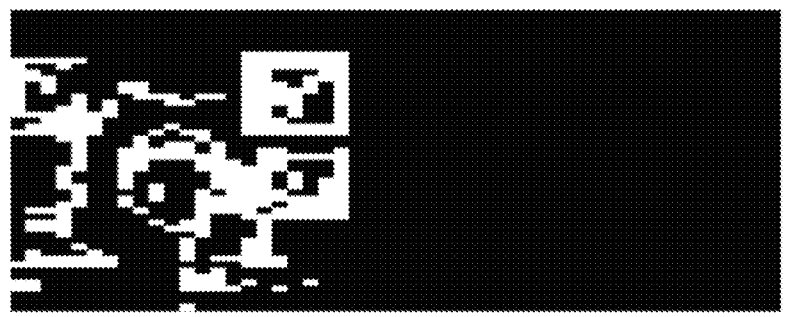

FIG. 3D depicts the generation of a binary matrix image 340 from the visual entropy filtered image 330 using downsampling. A binary matrix image 340 has values of 0's and 1's (representing black and white values respectively) for each pixel. Thus, unoccupied spaces in the binary matrix image or the downsampled binary matrix image may be viewed, without limitation, as consisting of spaces with pixel values of '0'.

Figure 3E:
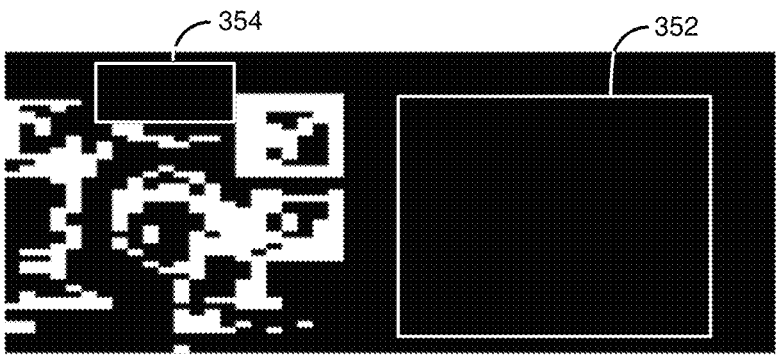

FIG. 3E depicts an image 350 in which candidate bounding boxes have been proposed in the binary matrix image 340. A "max rectangle in binary matrix" technique may be used to establish a set of rectangle candidates that satisfy predefined threshold parameters (e.g., a minimum width, a minimum height, etc.). Image 350 depicts two exemplary bounding box candidates 352 and 354.

Figure 4A:
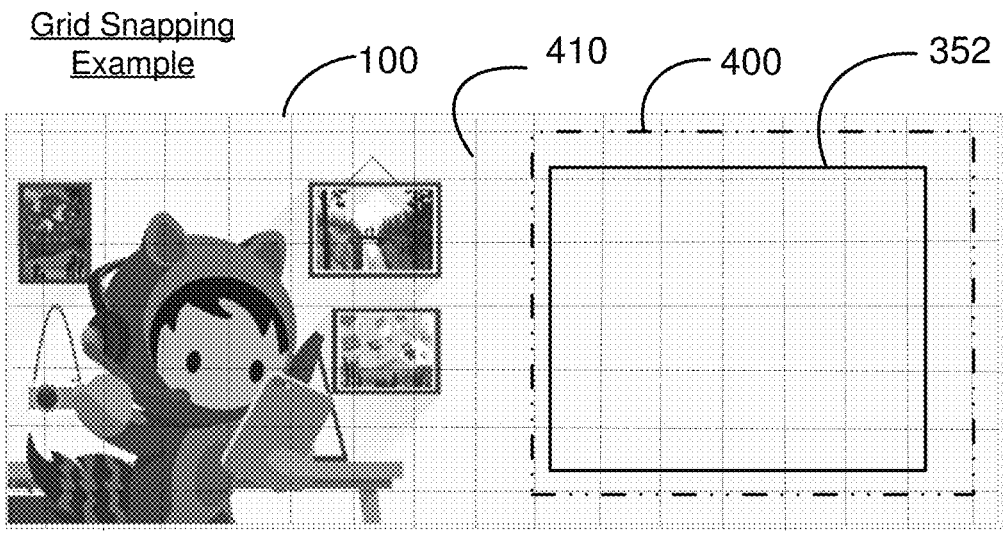
FIG. 4A-4C illustrate images with exemplary detected spaces for overlaying media content item, in accordance with some embodiments.

FIG. 4A depicts applying an example of a heuristic rule to select an optimal bounding box. An optimal bounding box candidate may be first selected using non-max suppression techniques based on Intersection over Union (IoU) approaches combined with confidence thresholds. In image 100, this results in the choice of bounding box 352 as the optimal bounding box candidate in image 100. A subsequent heuristic rule may be applied to the optimal bounding box candidate involving a grid snapping approach in which an imaginary grid is superimposed on the image, and a optimal bounding box is chosen by snapping the optimal bounding box candidate to the superimposed grid. Thus, grid 410 may be imposed on the image 100, and optimal bounding box 400 may be chosen as the insertion space for media content item by the grid snapping process, since bounding box 400 may be the closest bounding box from bounding box 352 when snapped to the grid 410.

Figure 4B:
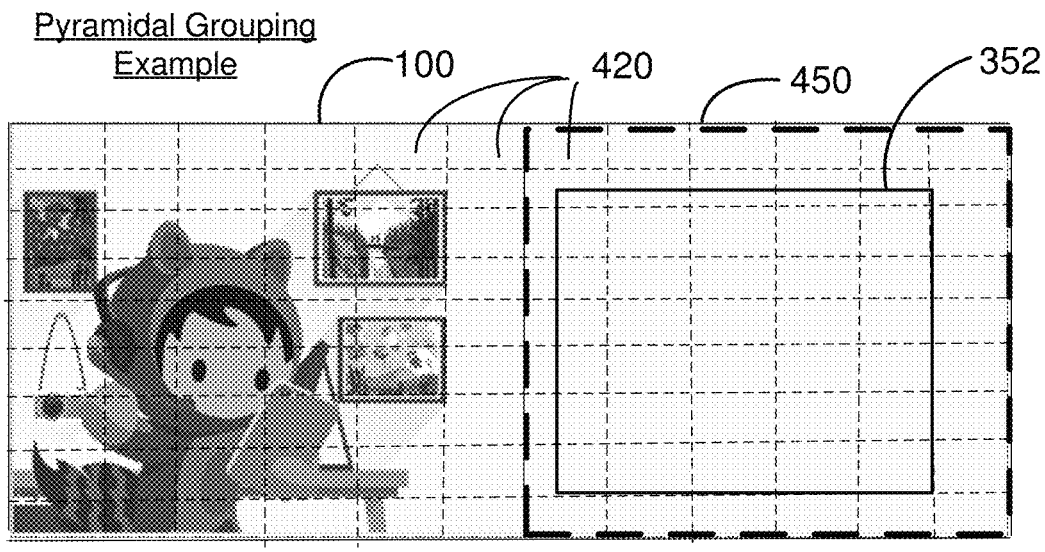

FIG. 4B depicts applying another example of a heuristic rule to select an optimal bounding box. Once an optimal bounding box candidate is chosen (e.g., using non-max suppression techniques based on Intersection over Union (IoU) approaches, etc.) another heuristic rule applied in some embodiments involves a pyramidal column grouping approach. In this approach, the image may be divided into multiple columns with the columns themselves grouped in a pyramid style. For example, the image may be divided into twelve columns, with four groups of three columns each, three groups of four columns, two groups of six columns each and a final group of all twelve columns. The group of columns that exhibits the best (i.e., within a predefined minimum threshold) overlap with the optimal bounding box candidate is chosen as the optimal bounding box. Thus, in FIG. 4B, the image 100 is divided into columns 420. The grouping 450 of six columns is subsequently chosen as the closest overlapping group to the optimal candidate bounding box 352. The insertion space for media content item is selected to be the space 450.

Figure 4C:
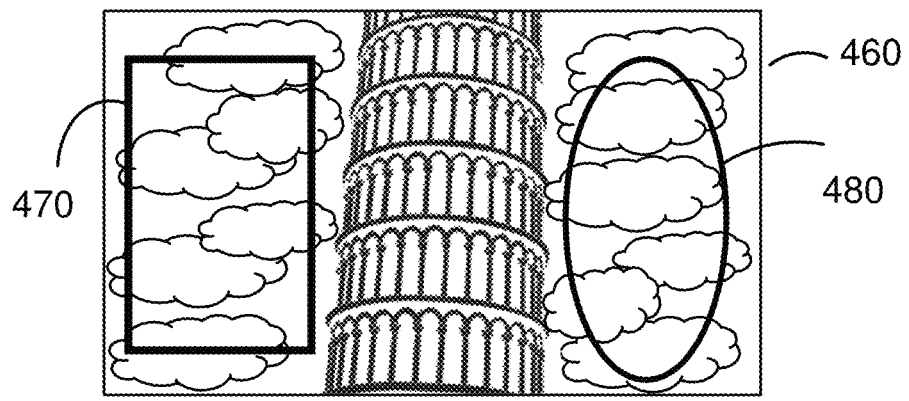

FIG. 4C illustrates another image 460 with two exemplary corresponding bounding boxes (bounding box 470 and bounding box 480). FIG. 4C illustrates that heuristic rules may be applied that define preferred shapes for selecting optimal bounding boxes, and that more than one optimal bounding box may be selected in accordance with some embodiments for inserting media content items. Thus, bounding box 470 is a rectangle, while bounding box 480 is an ellipse.

Figure 5:
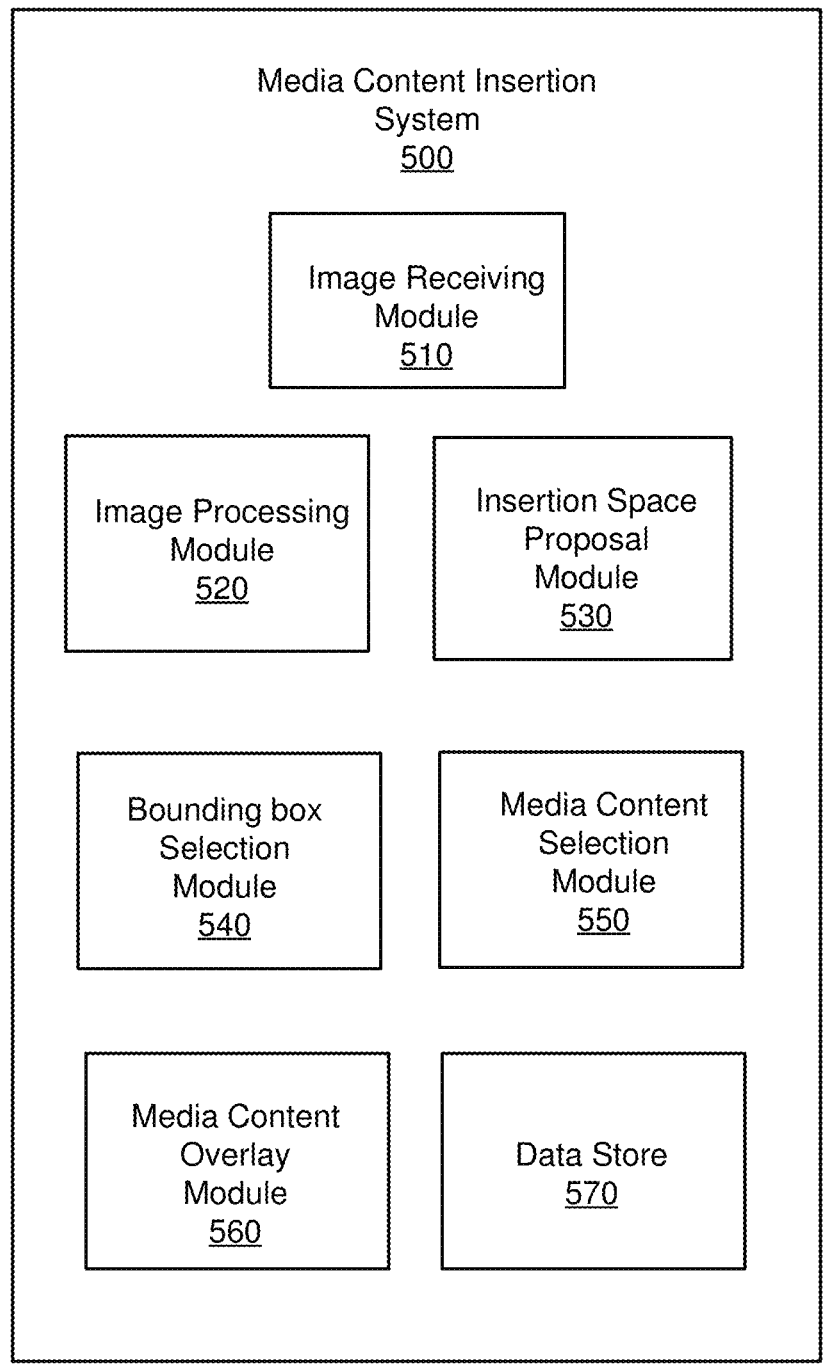
FIG. 5 is a block diagram of a media content insertion system, in accordance with some embodiments.

FIG. 5 is a block diagram illustrating components of a media content insertion system 500, in accordance with some embodiments. The media content insertion system 500 includes an image receiving module 510, an image processing module 520, an insertion space proposal module 530, a bounding box selection module 540, a media content selection module 550, a media content overlay module 560, and a data store 570. Other embodiments may include more or fewer modules than those shown in FIG. 5. Functionality indicated as being performed by a particular module may be performed by other modules than those indicated herein. Furthermore, steps of any processes described herein can be performed in an order different from that illustrated herein.

The image receiving module 510 receives an image for overlaying media content items. The image receiving module 510 may receive the image over a network or may receive instructions for retrieving the image from an image store. The image may be any appropriately formatted image. In some embodiments, the image may be a frame of a video content item that is also received by the image receiving module 510. In some embodiments, the image receiving module 510 may receive a video content item and extract image frames from the received video content item for further processing. In some embodiments, the image receiving module 510 may receive an identifier for a specific starting image frame (e.g., a time value associated with the specific frame) such that display of the video content from that frame onwards requires insertion of media content. In these embodiments, the specific starting image frame as well as image frames in the video content subsequent to the specific image frame may be processed by the media content insertion system 500. In some embodiments, the image receiving module 510 may receive an identifier for a specific ending image frame (e.g., an ending time value, a starting time value and a time interval, etc.). In these embodiments, the image frames extracted and stored for processing by the media content insertion system 500 may involve the frames that occur from the starting image frame up to and including the ending image frame. For example, the starting image frame may be a first frame in a set of consecutive frames to be played back by a video player and it may be desirable to insert a media content item (e.g., an advertisement) into at least some of those frames. The image receiving module 510 may pass the one or more images to the image processing module 520 or may store the received image in the data store 570 for retrieval by other modules of the media content insertion system 100.

The image processing module 520 processes the image using one or more image processing techniques. The image processing module 520 receives an image from the image receiving module 510. In some embodiments, the image processing module 520 may retrieve the image from the data store 570. In an embodiment, the image may be a color image. In this case, the image processing module 520 may first obtain a corresponding greyscale image. In some embodiments, the greyscale image 100 may be blurred (e.g., by using a low pass filter) to remove noise in the image before further processing occurs. The greyscale image may subsequently filtered using a gradient filter. The gradient filtering is performed to perform edge detection in the image, i.e., identify pixel locations where the image brightness changes by at least some predefined threshold. An example of a gradient filter is the Sobel gradient filter. In some embodiments, the greyscale image may be filtered by the image processing module 520 using an edge detection filter instead of using a gradient filter. Any suitable edge detection filter, such as the ShenCasten filter, the Sobel filter, or the Canney edge detector etc., may be used by the image processing module 520. The edge-detected image is then processed by the image processing module 520 using an image saliency filter that performs local image segmentation.

Some embodiments of the image processing module 520 may use supplemental machine learning techniques to identify text, people and faces in the greyscale or RGB image image—e.g., text in the image may be located using a single-shot text detector (ssd) network that identifies locations of words while people and faces in the image may be located using object classifiers. The identified text, people, and face regions in the image may then be blocked out as occupied spaces in the image.

The image processing module 520 performs adaptive binarization on the saliency filtered image uses the adaptive binarized image along with the original greyscale image to perform foreground/background estimation and generate a foreground/background estimated image. Visual entropy filtering may be performed by the image processing module 520 to generate a binary matrix image. This binary matrix image may be subsequently downsampled. The image processing module 520 may retrieve predefined parameter values for performing the various image processing techniques described herein from the data store 570. In some embodiments, the image processing module 520 may store the downsampled binary matrix image in the data store. In some embodiments, the image processing module 520 may send the downsampled binary matrix to the insertion space proposal module 530.

The insertion space proposal module 530 generates one or more proposed spaces in the image for media content item overlay. The insertion space proposal module 530 receives the downsampled binary matrix image generated by the image processing module 520. The insertion space proposal module 530 may retrieve the downsampled binary matrix image from the data store or it may receive the downsampled binary matrix image from the image processing module 520. The module 530 may also retrieve predefined minimum threshold parameters (e.g., width of rectangle, height of rectangle, and area of rectangle, etc.) from the data store 570.

The binary matrix image has values of 0's and 1's (representing black and white values respectively) for each pixel. Thus, unoccupied spaces in the binary matrix image or the downsampled binary matrix image may be viewed, without limitation, as consisting of spaces with pixel values of '0'. The insertion space proposal module 530 determines rectangular spaces that satisfy the predefined minimum threshold parameters and that fit into the unoccupied spaces in the downsampled binary matrix image received from the image processing module 520. In determining the rectangular spaces, the insertion space proposal module 530 may use a suitable variant of a "max rectangle in binary matrix" technique. The "max rectangle in binary matrix" technique determines possible rectangles in the downsampled binary matrix that reside in the unoccupied spaces and that satisfy the predefined minimum threshold parameters. In some embodiments, all determined rectangular spaces (i.e., rectangles) may be placed in a list that is sorted by area. In some embodiments, the insertion space proposal module 530 may store the sorted list of proposed rectangles in the data store 570. In some embodiments, the insertion space proposal module 530 may provide the sorted list of the rectangular spaces as the one or more proposed spaces for media content item overlay in the received image to the bounding box selection module 540. In some embodiments, the rectangles in the sorted list of rectangles may be each associated with a confidence measure. An exemplary confidence measure associated with a rectangle in the sorted list may be based on the occupied space residing within the rectangle when superimposed on the binary matrix image that is generated prior to being downsampled.

The bounding box selection module 540 applies one or more heuristic rules to automatically select bounding boxes in the image for media content item overlay from the proposed one or more spaces. The bounding box selection module 540 receives a set of proposed rectangles and associated confidence measures from the insertion space proposal module 530. The set of proposed rectangles may be in the form of the sorted list of rectangles generated by the insertion space proposal module 530. A bounding box refers to an area on an image that is selected as an insertion space for placing media content items. In an embodiment, multiple bounding boxes may be generated based on the number of media content items that may need to be inserted in the image. The information regarding the number of media content items that may need to be inserted may be retrieved from the data store by the bounding box selection module 540. In embodiments described herein, the bounding box may be any shape, including but not limited to, a rectangle, a square, a circle, a polygon, and any other suitable shape. The bounding box may be of an irregular dimension and/or combine multiple shapes. For example, a bounding box may be a square (e.g., represented by a coordinate and one offset), a circle (e.g., represented by a coordinate being the center of the circle and one dimension representing a radius or a diameter of the circle), an ellipse (e.g., represented by two radii and a coordinate at the center). In some embodiments, a bounding box may be described by a vector of points representing coordinates on the image. The vectors and connections of those vectors may represent a bounding box.

The bounding box selection module 540 applies heuristic rules to the sorted list of rectangles to select a target number of bounding boxes for media content item overlay from the proposed rectangles in the sorted list. The target number of bounding boxes may be based on a target number of media content items that need to be overlaid on the image. The heuristic rules applied to select the target number of bounding boxes for media content item insertion in the image may include heuristic rules that are based on core design principles. Such heuristic rules may include rules enforcing similarity between rectangles, enforcing proximity between rectangles, enforcing closure for a combination of rectangles to generate a combined irregular polygonal space, etc. The heuristic rules applied by the bounding box selection module 540 may have predefined priorities associated with them that define an order in which the heuristic rules may be applied. The bounding box selection module 540 may retrieve the heuristic rules as well as associated predefined threshold parameters for applying the heuristic rules from the data store 570.

In some embodiments, the bounding box selection module 540 may prune the sorted list generated by the insertion space proposal module 530 by selecting a single rectangle from each subset of rectangles in the list that meet a predefined threshold criteria for similarity (i.e., retain only dissimilar rectangles). The predefined similarity threshold parameters may be combinations of parameters such as location, area, width, and height for the proposed rectangles (for example, a heuristic rule for similarity may be that "two proposed rectangles are similar if the centroids of the two rectangles are located on the image at less than a predefined threshold distance from each other, and their aspect ratios differ by less than a predefined threshold value," a heuristic rule for pruning may be "if a subset of rectangles are labelled as similar, replace all of them by a single rectangle that is a weighted combination of individual rectangles in the subset," etc.). In some embodiments, the bounding box selection module 540 may use a variant of a "non-max suppression technique" based on an iterative approach using intersection over union (IoU) ratios in association with the confidence measures for pairs of proposed rectangles to select one or more rectangles.

In some embodiments, a heuristic rule may be applied to modify the selected rectangles to a minimal extent needed to ensure that the bounding boxes are the resulting rectangles that are affixed to lie (i.e., snapped) on an grid that is superimposed on the image. In some embodiments, another heuristic rule may involve a pyramidal column grouping approach. In this approach, the image may be divided into multiple adjacent columns with the adjacent columns themselves grouped in a pyramid style. For example, the image may be divided into twelve columns, with four groupings of three adjacent columns each, three groupings of four adjacent columns, two groupings of six adjacent columns each and a final grouping of all twelve columns. A heuristic rule may be applied to determine, for each of the selected rectangles, a grouping of adjacent columns from among the groupings of columns that overlaps best with the selected rectangle. Thus, a generated bounding box may be selected for media content overlay in the image based on determining a grouping of adjacent columns from multiple groupings of columns that are superimposed on the image such that the determined grouping of columns satisfies a predefined minimum threshold of overlap with a selected rectangle.

In some embodiments, the heuristic rules may specify predefined target properties for the generated bounding boxes, such as choosing a predefined number of bounding boxes, a target area, a target shape, target aspect ratios, and target location of a bounding box. For example, a heuristic rule may specify a preference for a media content overlay that takes the form of "a single banner that is overlaid centrally on the top of the image.". In some embodiments, if there is additional information that provides estimated depth values to pixel locations in the image, these depth estimates may also be used to select bounding boxes.

In some embodiments, the bounding box selection module 540 may generate the bounding box as a weighted combination of the selected one or more rectangles, the weights based on confidence measure associated with each of the selected rectangles. A bounding box may be described by parameters describing a location of the bounding box in the received image and parameters describing a layout of the bounding box in the received image. For example, a bounding box may be described by a rectangle including one or more coordinates on the image and one or more dimensions extending from the one or more coordinates. The coordinates may represent a particular pixel on the image. In some embodiments, a bounding box may be represented by a coordinate that is counted in terms of a number of pixels horizontally and vertically from the upper left-hand corner of the image and two dimensions. That coordinate may represent the upper left-hand corner of the bounding box. The two dimensions may include a vertical offset and a horizontal offset extending from the coordinate. Based on the coordinate and the offsets, a rectangular bounding box having an area based on the offsets and the location based on the coordinate may be generated. Other descriptions of the bounding box are possible in embodiments described herein, e.g., an ellipse that is a closest circumscribing ellipse to the weighted combination of the selected rectangles, etc. In some embodiments, the insertion space selection module 540 may store the description of a bounding box in the data store 570. In some embodiments, the bounding box selection module 540 may send the description of the bounding box to the media content overlay module 560.

The media content selection module 550 may receive the description of one or more bounding boxes. In some embodiments, the media content selection module 550 may retrieve the description of the one or more bounding boxes from the data store 570. The media content selection module 550 may extract dimensions from the descriptions associated with each bounding box and search for media content items in the data store 570 having dimensions that best match the extracted dimensions. The media content selection module 550 may select media content items from multiple media content items based on the dimensions of the content item matching the dimensions of a bounding box. Media content selection module 550 may retrieve the selected one or more media content items from the data store 570. In some embodiments, in addition to each selected media content item, the media content selection module 550 may extract metadata associated with each media content item. The metadata may include the dimensions of the corresponding media content item as well as other information (e.g., name, type (image, video, etc.)), orientation, and/or other suitable information. The media content selection module 550 may send the selected media content item and associated metadata to the media content overlay module 560. In some embodiments, the media content selection module 550 may alternatively send one or more identifiers of the selected media content items to the media content overlay module 560. Each identifier may be part of a data structure that also includes dimensions for each media content item. Other information may be included in the data structure (e.g., name, type (image, video, etc.)). This may be advantageous because media content items may be large in size and may take a long time to transfer in comparison to just transferring an identifier.

The media content overlay module 560 receives descriptions of one or more bounding boxes. In some embodiments, the descriptions may be received from the bounding box selection module 540. In some embodiments, the media content overlay module 560 may retrieve the description from the data store 570. The media content overlay module 560 may receive the media content items to be displayed in a bounding box from the media content item selection module 550. In some embodiments, the media content overlay module 560 may retrieve the media content items from the data store 570.

As noted previously, in some embodiments, the image may be an image frame of a video content item. The media content overlay module 560 may store location and layout information about the determined bounding boxes for one or more of the preceding frames, and apply heuristic rules to modify any of: the dimensions, layout, or location of the determined bounding boxes for image received from the bounding box selection module 540 to ensure that there that there is a smooth transition of the overlaid media content in each of the video frame images being displayed subsequent to the display of the received image when displaying the video content item.

The data store 570 receives and stores data for use and easy access by modules of the media content insertion system 500. The data store 570 may store one or more images received from the image receiving module 510. The data store 570 may store the binary matrix as well as the downsampled binary matrix generated by the image processing module 520. The data store 570 stores heuristic rules and threshold parameter values for use by processes that are executed by modules of the media content insertion system 500, for e.g., target bounding box description parameters, number of target bounding boxes, target area, location, and shape parameters, etc. The data store 570 may store intermediate data for use by the various modules of the media content insertion system 500, such as a proposed list of rectangles that may be used for selecting the actual insertion spaces. In some embodiments, the data store 570 may also be used to store media content items and associated metadata parameter values. The data store 570 is a memory, such as a read only memory (ROM), dynamic random-access memory (DRAM), static random-access memory (SRAM), or some combination thereof.

Overall Process

Figure 6:
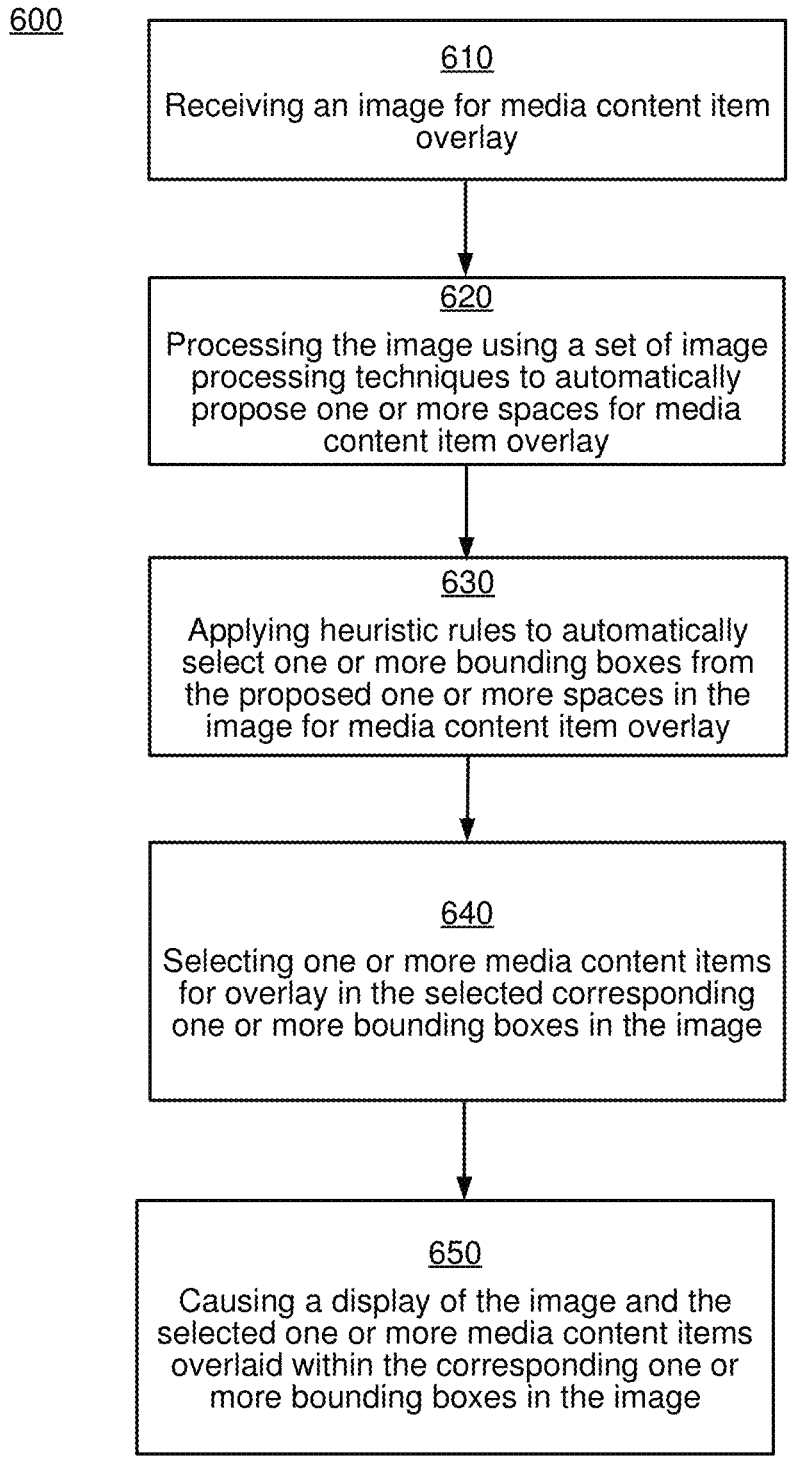
FIG. 6 is a flow chart illustrating the overall process for detecting space suitable for overlaying media content onto an image, in accordance with some embodiments.

FIG. 6 is a flowchart illustrating an overall process for detecting space suitable for overlaying media content onto an image, as performed by the media content insertion system 500, according to one embodiment. Various embodiments can perform the steps of FIG. 6 in different orders than those indicated herein. Moreover, other embodiments can include different and/or additional steps than the ones described herein.

The media content insertion system 500 receives 610 an image for media content item overlay. For example, media content insertion system 500 may receive 610 the image over a network or may receive instructions for retrieving the image from an image store. The media content insertion system 500 may receive 610 a video content item and may extract one or more image frames from the video content item.

The media content insertion system 500 processes 620 the received image using one or more image processing techniques to automatically generate one or more proposed spaces in the image for media content item overlay. The image processing techniques performed by the media content insertion system 500 include any combination of generating a greyscale images, blurring the image, performing gradient filtering or edge detection filtering, saliency filtering, using supplemental machine learning methods such as ssd networks and classifiers for text, people and face detection, foreground/background estimation, visual entropy filtering, generating a binary matrix, and downsampling, etc. The media content insertion system 500 determines rectangular spaces that satisfy predefined minimum threshold parameters in a binary matrix of the image, blocks out text and faces in the rectangular spaces in the generated binary matrix. Subsequently, the system 500 generates a sorted list of the rectangular spaces, wherein the sorting is performed based on a predefined parameter (e.g., area), and provides the rectangular spaces in the generated sorted list as one or more proposed spaces for media content item overlay in the image.

The media content insertion system 500 applies 630 heuristic rules to automatically select one or more bounding boxes from the one or more proposed spaces in the image for media content item overlay. The heuristic rules may be prioritized for application by the media content insertion system 500. The heuristic rules may involve, for example, (i) generating a bounding box based on modifying one or more proposed spaces to lie on a grid that is superimposed on the image, (ii) dividing the image into a number of adjacent columns, grouping the columns in a pyramidal manner, and generating a bounding box generated by selecting a group of adjacent columns that overlaps with a proposed space by at least a predefined threshold value (e.g., at least 80% of the selected rectangle overlaps with the selected group of adjacent columns), (iii) generating a bounding box that is a weighted combination of the one or more proposed spaces, (iv) generating a bounding box based on predefined target properties using the one or more proposed spaces, with predefined target properties including, e.g., number of bounding boxes, area, shape, aspect ratio, and location of a bounding box, etc., among other heuristic rules.

The media content insertion system 500 selects 640 media content items for overlay in the selected corresponding one or more bounding boxes in the image. In some embodiments, media content insertion system 500 may receive the description of one or more bounding boxes, and select media content items from multiple media content items based on the dimensions of the media content item matching the dimensions of a received description of a bounding box.

The media content insertion system 500 causes 650 a display of the image and the selected one or more media content items overlaid within the corresponding one or more bounding boxes in the image. For example, the media content insertion system 500 may transmit the overlaid candidate image to a client device for display. In some embodiments, the media content insertion system 500 may use a visual interface to cause the display of the overlaid candidate image.

Computing Machine Architecture

Figure 7:
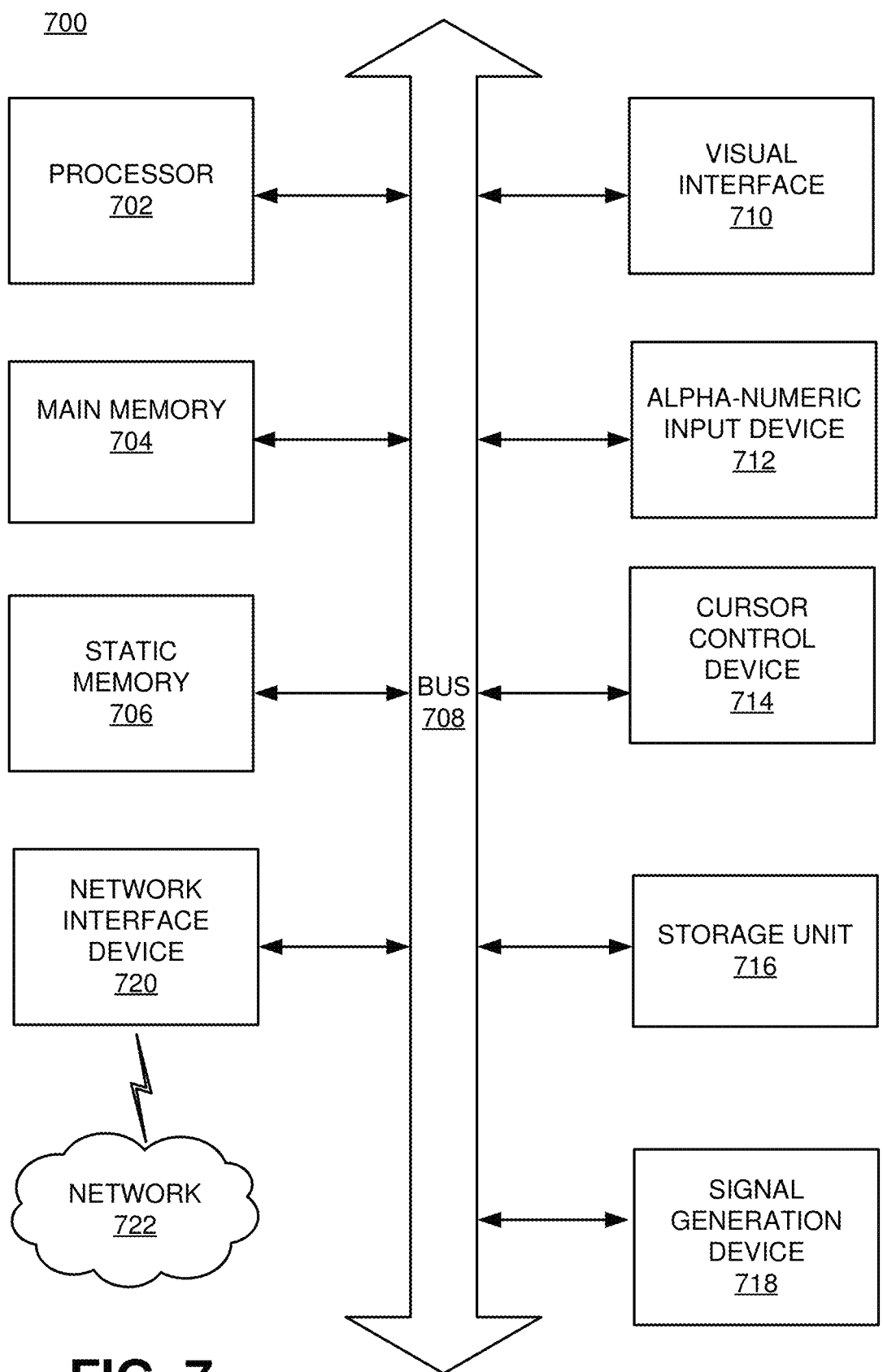
FIG. 7 is a is a block diagram illustrating the architecture of a typical computer system for use by modules of FIG. 5, in accordance with some embodiments.

The media content insertion system 500 may include one or more components described in FIG. 7. FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium on which is stored instructions (e.g., software) embodying any one or more of the methodologies or functions described herein. The instructions (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions (e.g., software) may be transmitted or received over a network 722 via the network interface device 720.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time.

For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inserting media content into copy space available on an image. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for detecting space suitable for overlaying media content onto an image, the method comprising:
   receiving an image for media content item overlay;
   processing the received image using a set of one or more image processing techniques to automatically generate one or more proposed spaces in the image for media content item overlay;
   applying one or more heuristic rules to automatically select one or more bounding boxes from the one or more proposed spaces in the image for media content item overlay, wherein applying the one or more heuristic rules comprises generating a bounding box based on a grouping of adjacent columns, the grouping being in a pyramidal style, the grouping determined from multiple groupings of adjacent columns superimposed on the image, the determined grouping satisfying a predefined minimum threshold of overlap with a proposed space of the one or more proposed spaces;
   selecting one or more media content items for overlay in the selected corresponding one or more bounding boxes in the image; and
   causing a display of the image and the selected one or more media content items overlaid within the corresponding one or more bounding boxes in the image.

2. The method of claim 1, wherein processing the received image using a set of one or more image processing techniques to automatically generate one or more proposed spaces for media content item overlay further comprises:
   generating a binary matrix representation of the received image;
   determining one or more rectangular spaces that satisfy predefined minimum threshold parameters in the generated binary matrix;
   blocking out text and faces in the determined one or more rectangular spaces in the generated binary matrix;
   generating a sorted list of the rectangular spaces, wherein the sorting is performed based on a predefined parameter; and
   providing the rectangular spaces in the generated sorted list as the one or more proposed spaces for media content item overlay in the received image.

3. The method of claim 1, wherein applying one or more heuristic rules to automatically select one or more bounding boxes from the one or more proposed spaces in the image for media content item overlay comprises one or more of:
   generating a bounding box based on modifying one or more proposed spaces to lie on a grid that is superimposed on the image;
   generating a bounding box that is based on determining a grouping of adjacent columns from multiple groupings of adjacent columns that are superimposed on the image such that the determined group of adjacent columns satisfies a predefined minimum threshold of overlap with a proposed space of the one or more proposed spaces;
   generating a bounding box that is a weighted combination of the one or more proposed spaces; and
   generating a bounding box based on predefined target properties using the one or more proposed spaces.

4. The method of claim 3, wherein the predefined target properties comprise:
   number of bounding boxes;
   area of a bounding box;
   shape of a bounding box;
   aspect ratio of a bounding box; and
   location of a bounding box.

5. The method of claim 1, wherein the selected one or more bounding boxes are described by parameters describing a location of the bounding box in the received image and parameters describing a layout of the bounding box in the received image.

6. The method of claim 1, further comprising:
   determining that the received image is a video frame associated with a video content item;
   retrieving a set of video frames of the video content item, wherein the set of video frames comprises video frames that are displayed subsequent to displaying the received image;
   processing each video frame in the retrieved set of video frames using a set of one or more image processing techniques to automatically generate one or more proposed spaces in each video frame for media content item overlay;
   applying one or more heuristic rules to automatically select one or more bounding boxes from the one or more proposed spaces in each video frame for media content item overlay; and
   causing a display of each video frame image and the selected one or more media content items overlaid within the corresponding one or more bounding boxes in each video frame.

7. The method of claim 6, wherein applying one or more heuristic rules to automatically select one or more bounding boxes from the one or more proposed spaces in each video frame for media content item overlay further comprises ensuring that there is a smooth transition of the overlaid media content in each of the video frame images being displayed subsequent to the display of the received image when displaying the video content item.

8. A non-transitory computer readable storage medium for storing instructions that when executed by a computer processor cause the computer processor to perform steps for detecting space suitable for overlaying media content onto an image, the steps comprising:
   receiving an image for media content item overlay;
   processing the received image using a set of one or more image processing techniques to automatically generate one or more proposed spaces in the image for media content item overlay;
   applying one or more heuristic rules to automatically select one or more bounding boxes from the one or more proposed spaces in the image for media content item overlay, wherein applying the one or more heuristic rules comprises generating a bounding box based on a grouping of adjacent columns, the grouping being in a pyramidal style, the grouping determined from multiple groupings of adjacent columns superimposed on the image, the determined grouping satisfying a predefined minimum threshold of overlap with a proposed space of the one or more proposed spaces;

selecting one or more media content items for overlay in the selected corresponding one or more bounding boxes in the image; and causing a display of the image and the selected one or more media content items overlaid within the corresponding one or more bounding boxes in the image.

9. The non-transitory computer readable storage medium of claim 8, wherein processing the received image using a set of one or more image processing techniques to automatically generate one or more proposed spaces for media content item overlay further comprises:

generating a binary matrix representation of the received image;

determining one or more rectangular spaces that satisfy predefined minimum threshold parameters in the generated binary matrix;

blocking out text and faces in the determined one or more rectangular spaces in the generated binary matrix;

generating a sorted list of the rectangular spaces, wherein the sorting is performed based on a predefined parameter; and providing the rectangular spaces in the generated sorted list as the one or more proposed spaces for media content item overlay in the received image.

10. The non-transitory computer readable storage medium of claim 8, wherein applying one or more heuristic rules to automatically select one or more bounding boxes from the one or more proposed spaces in the image for media content item overlay comprises one or more of:

generating a bounding box based on modifying one or more proposed spaces to lie on a grid that is superimposed on the image;

generating a bounding box that is based on determining a grouping of adjacent columns from multiple groupings of adjacent columns that are superimposed on the image such that the determined group of adjacent columns satisfies a predefined minimum threshold of overlap with a proposed space of the one or more proposed spaces;

generating a bounding box that is a weighted combination of the one or more proposed spaces; and generating a bounding box based on predefined target properties using the one or more proposed spaces.

11. The non-transitory computer readable storage medium of claim 10, wherein the predefined target properties comprise:

number of bounding boxes;
area of a bounding box;
shape of a bounding box;
aspect ratio of a bounding box; and
location of a bounding box.

12. The non-transitory computer readable storage medium of claim 8, wherein the selected one or more bounding boxes are described by parameters describing a location of the bounding box in the received image and parameters describing a layout of the bounding box in the received image.

13. The non-transitory computer readable storage medium of claim 8, further comprising:

determining that the received image is a video frame associated with a video content item;

retrieving a set of video frames of the video content item, wherein the set of video frames comprises video frames that are displayed subsequent to displaying the received image;

processing each video frame in the retrieved set of video frames using a set of one or more image processing techniques to automatically generate one or more proposed spaces in each video frame for media content item overlay;

applying one or more heuristic rules to automatically select one or more bounding boxes from the one or more proposed spaces in each video frame for media content item overlay; and causing a display of each video frame image and the selected one or more media content items overlaid within the corresponding one or more bounding boxes in each video frame.

14. The non-transitory computer readable storage medium of claim 13, wherein applying one or more heuristic rules to automatically select one or more bounding boxes from the one or more proposed spaces in each video frame for media content item overlay further comprises ensuring that there is a smooth transition of the overlaid media content in each of the video frame images being displayed subsequent to the display of the received image when displaying the video content item.

15. A computer system comprising:

a computer processor; and a non-transitory computer readable storage medium for storing instructions that when executed by a computer processor cause the computer processor to perform steps for detecting space suitable for overlaying media content onto an image, the steps comprising:

receiving an image for media content item overlay;

processing the received image using a set of one or more image processing techniques to automatically generate one or more proposed spaces in the image for media content item overlay;

applying one or more heuristic rules to automatically select one or more bounding boxes from the one or more proposed spaces in the image for media content item overlay, wherein applying the one or more heuristic rules comprises generating a bounding box based on a grouping of adjacent columns, the grouping being in a pyramidal style, the grouping determined from multiple groupings of adjacent columns superimposed on the image, the determined grouping satisfying a predefined minimum threshold of overlap with a proposed space of the one or more proposed spaces;

selecting one or more media content items for overlay in the selected corresponding one or more bounding boxes in the image; and causing a display of the image and the selected one or more media content items overlaid within the corresponding one or more bounding boxes in the image.

16. The system of claim 15, wherein processing the received image using a set of one or more image processing techniques to automatically generate one or more proposed spaces for media content item overlay further comprises:

generating a binary matrix representation of the received image;

determining one or more rectangular spaces that satisfy predefined minimum threshold parameters in the generated binary matrix;

blocking out text and faces in the determined one or more rectangular spaces in the generated binary matrix;

generating a sorted list of the rectangular spaces, wherein the sorting is performed based on a predefined parameter; and providing the rectangular spaces in the generated sorted list as the one or more proposed spaces for media content item overlay in the received image.

17. The system of claim 15, wherein applying one or more heuristic rules to automatically select one or more bounding boxes from the one or more proposed spaces in the image for media content item overlay comprises one or more of:

generating a bounding box based on modifying one or more proposed spaces to lie on a grid that is superimposed on the image;

generating a bounding box that is based on determining a grouping of adjacent columns from multiple groupings of adjacent columns that are superimposed on the image such that the determined group of adjacent columns satisfies a predefined minimum threshold of overlap with a proposed space of the one or more proposed spaces;

generating a bounding box that is a weighted combination of the one or more proposed spaces; and generating a bounding box based on predefined target properties using the one or more proposed spaces.

18. The system of claim 17, wherein the predefined target properties comprise:

number of bounding boxes;

area of a bounding box;

shape of a bounding box;

aspect ratio of a bounding box; and location of a bounding box.

19. The system of claim 15, wherein the selected one or more bounding boxes are described by parameters describing a location of the bounding box in the received image and parameters describing a layout of the bounding box in the received image.

20. The system of claim 15, further comprising:

determining that the received image is a video frame associated with a video content item;

retrieving a set of video frames of the video content item, wherein the set of video frames comprises video frames that are displayed subsequent to displaying the received image;

processing each video frame in the retrieved set of video frames using a set of one or more image processing techniques to automatically generate one or more proposed spaces in each video frame for media content item overlay;

applying one or more heuristic rules to automatically select one or more bounding boxes from the one or more proposed spaces in each video frame for media content item overlay; and causing a display of each video frame image and the selected one or more media content items overlaid within the corresponding one or more bounding boxes in each video frame.

* * * * *